(12) United States Patent
Piras et al.

(10) Patent No.: US 10,729,284 B2
(45) Date of Patent: Aug. 4, 2020

(54) DEVICE AND METHOD FOR GRINDING COFFEE BEANS (71) Applicant: Illycaffè S.p.A. con unico socio, Trieste (IT)

(72) Inventors: Riccardo Piras, Monza (IT); Bruno Spreafico, Ello (IT); Furio Suggi Liverani, Trieste (IT)

(73) Assignee: ILLYCAFFE' S.P.A. CON UNICO SOCIO, Trieste (IT)

( * ) Notice: Subject to any disclaimer, the term of this patent is extended or adjusted under 35 U.S.C. 154(b) by 225 days.

(21) Appl. No.: 15/566,029

(22) PCT Filed: Apr. 14, 2016

(86) PCT No.: PCT/EP2016/058232
§ 371 (c)(1),
(2) Date: Oct. 12, 2017

(87) PCT Pub. No.: WO2016/166216
PCT Pub. Date: Oct. 20, 2016

(65) Prior Publication Data
US 2018/0110369 A1    Apr. 26, 2018

(30) Foreign Application Priority Data

Apr. 14, 2015   (IT) .............................. UD2015A0048

(51) Int. Cl.
*A47J 42/08* (2006.01)
*A47J 42/40* (2006.01)
(Continued)

(52) U.S. Cl.
CPC ................. *A47J 42/08* (2013.01); *A23F 5/08* (2013.01); *A23F 5/24* (2013.01); *A47J 31/42* (2013.01);
(Continued)

(58) Field of Classification Search
CPC .. A47J 42/08; A47J 42/10; A47J 42/40; A47J 42/44; A47J 31/42; A23F 5/08; A23F 5/24
See application file for complete search history.

(56) References Cited

U.S. PATENT DOCUMENTS 3,997,120 A   12/1976  Zimmer et al.
5,632,449 A   5/1997   Sandolo
(Continued)

FOREIGN PATENT DOCUMENTS

EP    2050377 A1    4/2009
EP    2710938 A2    3/2014
(Continued)

OTHER PUBLICATIONS

DeepL.com English Translation for EP2710938 published Mar. 2014.*
Int'l Search Report and Written Opinion dated Jul. 6, 2016 in Int'l Application No. PCT/EP2016/058232.

*Primary Examiner* — Anthony J Weier
(74) *Attorney, Agent, or Firm* — Panitch Schwarze Belisario & Nadel LLP (57) ABSTRACT

A device for grinding coffee beans (12) includes a grinding member (14) configured to grind coffee beans (12) and produce a ground coffee powder (15). A transit chamber (16) receives the ground coffee powder (15). A discharge member (18) is configured to discharge the ground coffee powder (15) arriving from the transit chamber (16) toward the outside of the device. An air-powered powder removal member (20) removes the ground coffee powder (15) from the grinding member (14) and from the transit chamber (16).

22 Claims, 3 Drawing Sheets (51) Int. Cl.
  *A47J 42/10* (2006.01)
  *A47J 42/44* (2006.01)
  *A47J 31/42* (2006.01)
  *A23F 5/08* (2006.01)
  *A23F 5/24* (2006.01)

(52) U.S. Cl.
  CPC .............. *A47J 42/10* (2013.01); *A47J 42/40* (2013.01); *A47J 42/44* (2013.01)

(56) References Cited

U.S. PATENT DOCUMENTS

2010/0058931 A1\* 3/2010 Righetti ................ A47J 31/401
  99/286
2014/0356502 A1\* 12/2014 Goeltenboth ....... A47J 31/0663
  426/433

FOREIGN PATENT DOCUMENTS

| WO | 200148711 A1 | 7/2001 |
| WO | 2014206944 A1 | 12/2014 |

\* cited by examiner fig. 1 fig. 2 fig. 3 fig. 4 fig. 5 fig. 6 fig. 7 fig. 8 fig. 9

DEVICE AND METHOD FOR GRINDING COFFEE BEANS

CROSS-REFERENCE TO RELATED APPLICATION

This application is a Section 371 of International Application No. PCT/EP2016/058232, filed Apr. 14, 2016, which was published in the English language on Oct. 20, 2016, under International Publication No. WO 2016/166216 A1, and the disclosure of which is incorporated herein by reference.

FIELD OF THE INVENTION

Embodiments described here concern a device and a method for grinding coffee beans, in particular to obtain ground coffee powder used to prepare espresso coffee.

BACKGROUND OF THE INVENTION

It is known to prepare a coffee drink, in particular espresso coffee, using coffee powder obtained by grinding coffee beans. The coffee drink, hereafter also called simply coffee, is generally obtained by extraction, that is, percolation with boiling water under pressure. In particular, machines are known for the production of espresso coffee, which are provided with a tank for the water from which, using a pump, the water is delivered at high pressure to a heating unit. From this hot water and/or steam is obtained, which is used in a coffee extraction unit, where it is percolated through the coffee powder to produce the espresso coffee.

It is possible to use coffee powder obtained by grinding coffee beans of the same type or variety, or to use a mixture of coffee powder obtained by grinding coffee beans of a different type or variety.

Different proportions of different types or varieties of coffee in the powdered mixture influence the organoleptic properties of the coffee prepared with them, such as taste, aroma, acidity and body.

Real coffee lovers or enthusiasts can detect variations, even minimal, in the organoleptic properties, and these can influence their judgment of the drink and the choice or preference of one coffee powder mixture obtained by grinding a certain selection of beans of different types of coffee compared with another mixture. Furthermore, even a minimum contamination of mixtures of coffee powder formed from different selections of coffee can lead to detectable differences.

Document EP-A-2.710.938 describes a coffee-grinding device provided with grinders to grind coffee beans stored in a container disposed above the grinders. The ground coffee powder is discharged through an exit disposed under the grinders. The coffee-grinding device comprises a fan housed in the container for the un-ground coffee provided above the grinders. The fan is provided to generate a stream of air that flows through the container of ground coffee above the grinders, from an air inlet to an air outlet, so as to remove the essential oils from the un-ground coffee. The stream of air does not pass through the grinders, nor does it interact with the ground coffee. In fact, the essential oils removed from the un-ground coffee are removed both to be recovered for the purpose of producing aromas, and also to prevent the essential oils from dirtying the grinders, and therefore the coffee-grinding device needs fewer cleaning interventions and is more efficient. This known solution therefore does not solve the problem of the contamination between mixtures of coffee powder formed from different selections of coffee ground in sequence in the grinding member.

Document WO-A-2014/206944 describes a coffee-grinding dispenser provided with a support base containing a grinding chamber. The base houses an electric motor with a shaft rotationally connected to a second shaft, but axially free, to rotate a driven grinding wheel. The base also houses a bushing inside which the second shaft rotates freely but is axially constrained. The bushing has a threaded lateral surface that cooperates with a rigid threaded portion with the base. The driven grinding wheel is axially constrained to the bushing. The coffee-grinding dispenser also comprises means to rotate the bushing axially. Furthermore, the base houses a fixed grinding wheel facing the driven grinding wheel inside the grinding chamber, the fixed grinding wheel being non-removably connected in a determinate position to the base frame.

Document WO-A-01/48711 describes an automatic machine for selling products in grains, such as for example coffee beans or other products.

There is therefore a need to perfect a device and method for grinding coffee beans that can overcome at least one of the disadvantages of the state of the art.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with some embodiments, a device for grinding coffee beans is provided. According to one embodiment, the device comprises:
   a grinding member configured to grind coffee beans and to produce a ground coffee powder;
   a transit chamber configured to receive the ground coffee powder;
   a discharge member configured to discharge the ground coffee powder arriving from the transit chamber toward the outside of the device;
   at least one air-powered powder removal member configured to generate a stream of air through the grinding member, in order to remove ground coffee powder from the grinding member and from the transit chamber.

According to other embodiments, a station for preparing coffee is provided. According to one embodiment, the station comprises an apparatus to feed metered quantities of coffee beans to supply a mixture of coffee beans with a desired composition, a device to grind coffee beans according to embodiments described here, and a coffee machine, able to produce the coffee drink from the mixture of coffee powder obtained.

According to other embodiments, a method for grinding coffee beans is provided. According to one embodiment, the method comprises:
   grinding coffee beans by means of a grinding member to produce a ground coffee powder that is made to transit through a transit chamber and, by means of a discharge member, is then discharged toward a receiving container;

removing ground coffee powder from the grinding member and from the transit chamber by means of a stream of air generated through said grinding member.

According to other embodiments, a method for preparing coffee is provided. According to one embodiment, the method comprises:

feeding metered quantities of coffee beans to supply a mixture of coffee beans with a desired composition;

grinding the coffee beans into the desired composition in accordance with a grinding method as described here;

producing the coffee drink from a mixture of ground coffee powder obtained from grinding.

These and other aspects, characteristics and advantages of the present disclosure will be better understood with reference to the following description, drawings and attached claims. The drawings, which are integrated and form part of the present description, show some embodiments of the present invention, and together with the description, are intended to describe the principles of the disclosure.

The various aspects and characteristics described in the present description can be applied individually where possible. These individual aspects, for example aspects and characteristics described in the description or in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We shall now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

The use of terms such as "including", "comprising", "having" and their variations is intended to include the elements listed after them and their equivalents, and also additional elements. Unless otherwise specified, terms such as "mounted", "connected", "supported" and "coupled" and their variations are used in the widest sense and include both direct and indirect assemblies, connections, supports and couplings. Furthermore, the terms "connected" and "coupled" cannot be limited to physical or mechanical connections or couplings.

Embodiments described here concern a device 10 and a method for grinding coffee beans.

We must point out here that grinding coffee beans as intended in the embodiments described here can be directed to produce a ground coffee powder usable for example for preparing espresso coffee. Espresso coffee is obtained by extracting rapidly, with hot water and/or steam at considerable pressure, substances contained in a compressed panel of ground coffee held on a filter. The extraction process can be influenced by various factors, including the grain size of the ground coffee, the specific surface of the granules and the compacting of the panel of ground coffee. Furthermore, in order to obtain a coffee with the desired and specific organoleptic properties of the mixture or type of coffee selected, different and variable profiles or trends of temperature and pressure can be applied, depending on the type of coffee selected.

A device 10 and a method for grinding coffee beans according to the present description can be used for example to grind coffee beans of different types, selected on each occasion according to a recipe or specific mixture and directed to the tastes and wishes of a final consumer.

For example, a device 10 and a method for grinding coffee beans according to the present description can be used in association with an apparatus for the metered feed of coffee beans that allows to produce, with suitable repeatability and reliability, mixtures of coffee powder obtained by grinding selections of beans of different types of coffee, in particular according to personalized recipes or recipes that can be personalized by a user or specific operator.

One example of an apparatus for the metered feed of coffee beans usable in association with the present embodiments is described in the application for a patent of industrial invention in Italy n. UD2015A000002 filed on 12 Jan. 2015 by the present Applicant. Using a device and method according to the present description in association with an apparatus for the metered feed of coffee beans advantageously allows to reproduce, repeatably and reliably, the specific mixtures of coffee powder, thus satisfying the tastes of the consumers.

Furthermore, a device and method according to the present description in association with an apparatus for the metered feed of coffee beans can be further associated with a selector device to produce personalized mixtures as described in the application for a patent of industrial invention in Italy n. UD2014A000146 filed on 22 Aug. 2014 by the present Applicant.

Figure 1:
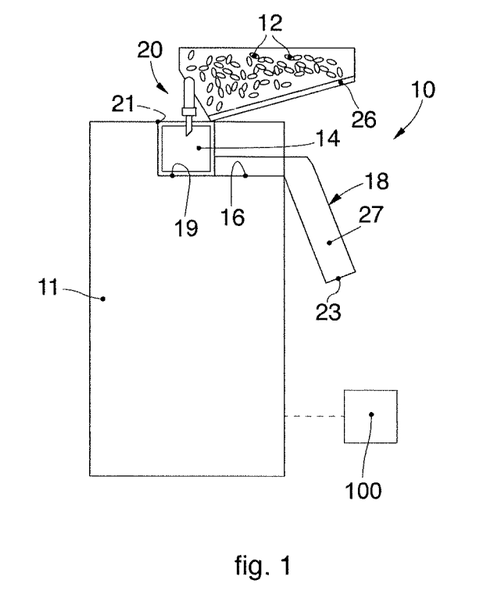
FIG. 1 is a schematic representation of a device for grinding coffee beans according to embodiments described here.

FIG. 1 is used to describe embodiments of a device 10 for grinding coffee beans 12. The device 10 includes a grinding member 14 configured to grind coffee beans 12 and produce a ground coffee powder 15, a transit chamber 16 configured to receive the ground coffee powder 15 from the grinding member 14, and a discharge member 18 configured to discharge the ground coffee powder 15 arriving from the transit chamber 16 toward the outside of the device 10. According to the present description, the device 10 also comprises at least one air-powered powder removal member 20 configured to generate a stream of air through the grinding member 14, in order to remove ground coffee powder 15 from the grinding member 14 and from the transit chamber 16.

According to some embodiments, a method is also provided for grinding coffee beans 12 which comprises:

grinding coffee beans 12 by means of a grinding member 14 to produce a ground coffee powder 15 that is made to transit through a transit chamber 16 and, by means of a discharge member 18 downstream of the transit chamber 16, is then discharged toward a receiving container, such as a filter, a package or suchlike;

removing ground coffee powder 15 from the grinding member 14 and from the transit chamber 16 by means of a stream of air generated by the air-powered powder removal member 20 through the grinding member 14.

Figure 2:
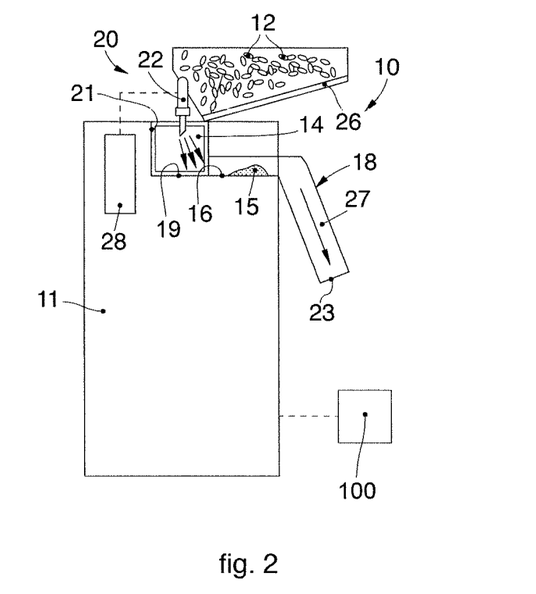
FIG. 2 is a schematic representation of a device for grinding coffee beans according to other embodiments described here.
Figure 5:
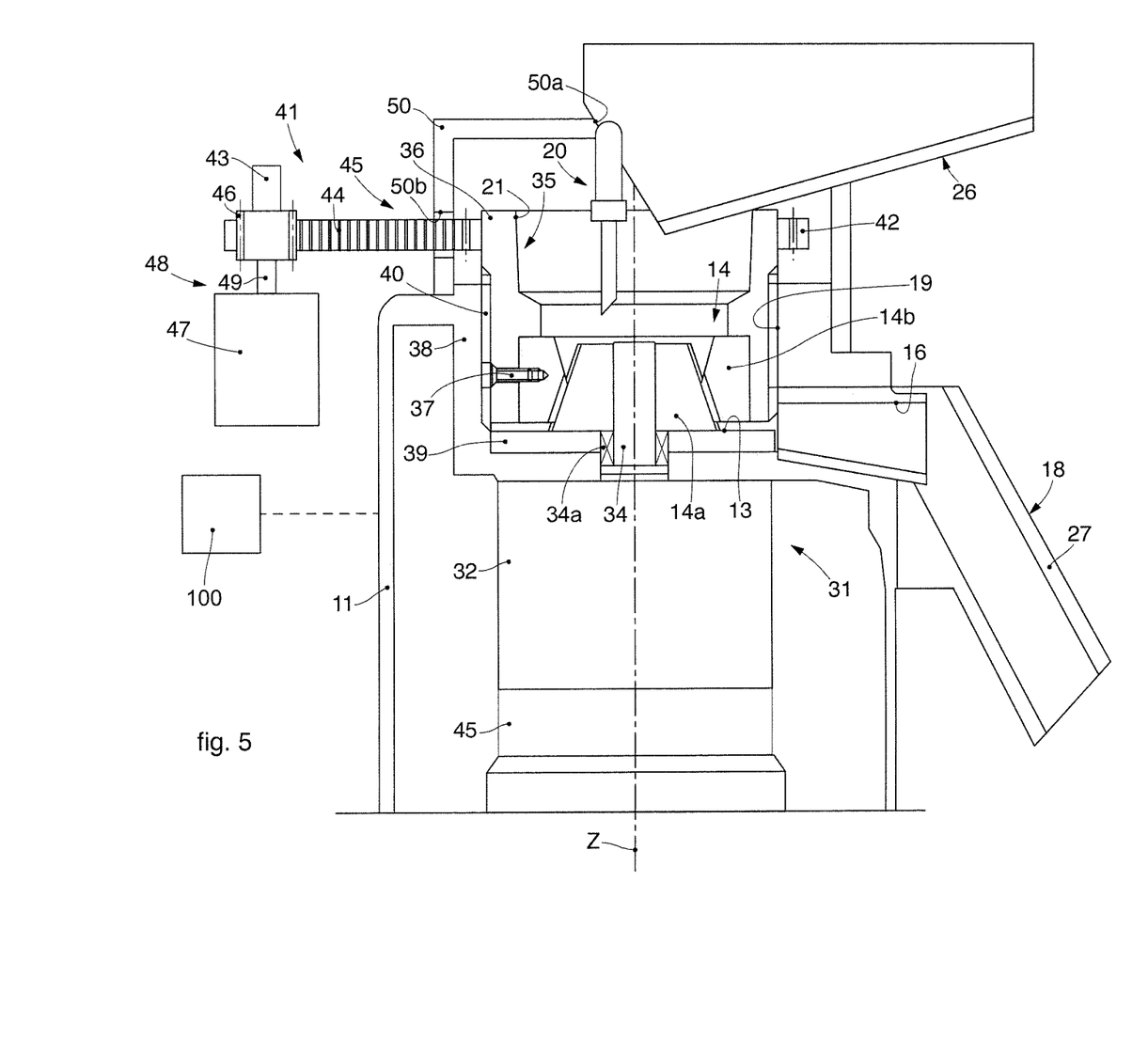
FIG. 5 is a section of a part of a device for grinding coffee beans according to embodiments described here.

For example, as described in more detail hereafter, in possible implementations the stream of air generated through the grinding member 14 to remove ground coffee powder 15 from the grinding member 14 and the transit chamber 16 can develop along a path that passes through the grinding member 14, the transit chamber 16 and also the discharge member 18, with reference for example to the embodiments described using FIGS. 1, 2 and 5 and as indicated for example by the arrows in FIG. 2.

Figure 3:
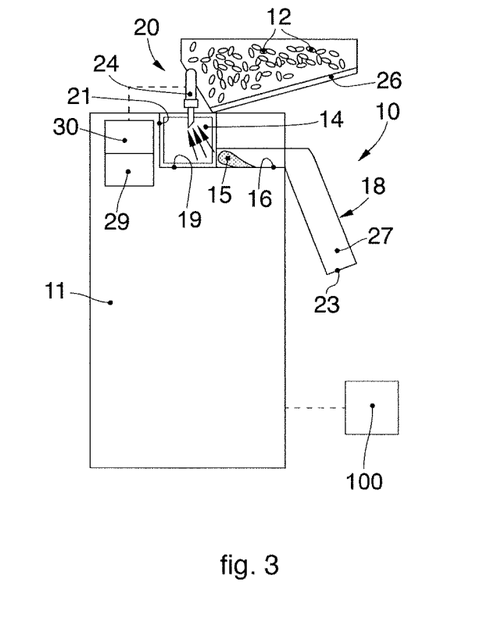
FIG. 3 is a schematic representation of a device for grinding coffee beans according to other embodiments described here.

In other possible implementations, the stream of air generated through the grinding member 14 to remove ground coffee powder 15 from the grinding member 14 and the transit chamber 16 can develop along a path that passes through the transit chamber 16 and the grinding member 14, with reference for example to the embodiments described using FIGS. 1, 3 and 5 and as indicated for example by the arrows in FIG. 3.

In possible implementations, the device 10 can be provided with a grinding chamber 19 which houses the grinding member 14. The grinding chamber 19 that houses the grinding member 14 is in communication, downstream of the grinding member 14, with the transit chamber 16. The stream of air generated through the grinding member 14 to remove ground coffee powder 15 from the grinding member 14 and the transit chamber 16 therefore passes through the grinding chamber 19.

In possible implementations, the air-powered powder removal member 20 can for example be disposed in an upper part of the device 10, in cooperation with the grinding member 14.

In possible implementations, the device 10 is provided with an entrance aperture 21 through which to feed the coffee beans, and an exit aperture 23 through which the ground coffee powder 15 is discharged to the outside. The entrance aperture 21 can be provided in an upper portion of the device 10. For example, the grinding chamber 19 can be provided with the entrance aperture 21.

In possible implementations, the air-powered powder removal member 20 can be disposed near the entrance aperture 21, upstream of the grinding member 14 and hence, generating a stream of air whose path passes through the grinding member 14, can perform its removal action also on the grinding member 14 itself, as well as on the transit chamber 16.

The entrance aperture 21 is associated with the grinding member 14, while the exit aperture 23 is associated with the discharge member 18.

Between the entrance aperture 21 and the exit aperture 23, a working path therefore develops, working the coffee beans 12 to ground coffee powder 15. In particular, the working path affects the working steps from when the coffee beans 12 are introduced into the device 10, in particular into the grinding chamber 19 where they are ground by the grinding member 14, and then made to transit through the transit chamber 16 and discharged by the discharge member 18 toward the outside as coffee powder 15. It is therefore possible to remove, by means of the air-powered powder removal member 20, the residual coffee powder from the working path, thanks to the stream of air generated through the grinding member 14. A powder expulsion channel 13 can be provided, which connects the grinding member 14 to the transit chamber 16 and which can therefore be part of the working path. The removal of the coffee powder by the air-powered powder removal member 20 can therefore take place in the powder expulsion channel 13 as well.

In possible implementations, the entrance aperture 21 is disposed in the upper part of the device 10, upstream of the grinding member 14, and the transit chamber 16 is disposed directly at exit from the grinding member 14, for example adjacent at the side, that is, downstream of the latter with respect to the working path of the coffee, to receive the ground coffee powder 15 from the grinding member 14. Downstream of the transit chamber 16, along the working path, the discharge member 18 is provided.

In possible implementations, the grinding member 14 can include two reciprocally mobile grinders, and can be configured to carry out the grinding by exploiting a relative rotation movement of the grinders of which it consists, as described in more detail hereafter. The rotation movement generates a centrifugal force acting on the ground coffee powder 15, which directs it, for example essentially with a radial movement, toward the transit chamber 16 and from here to the discharge member 18.

In possible implementations, the discharge member 18 can be a mechanical discharge member. For example, the discharge member 18 can be a passive discharge member or an active discharge member, or a combination of the two.

For example, in some variants the discharge member 18 can be the passive mechanical type and can exploit the force of gravity to make the ground coffee powder 15 descend toward the outside of the device 10. In these variants, the discharge member 18 for example can be a slide, a beak, a channel or inclined plane, which receives the ground coffee powder 15 thrust by the centrifugal force of the grinding member 14 and sends it toward the outside of the device 10.

In other variants, the discharge member 18 can be the active mechanical type, for example it can be a mobile member that thrusts or draws the ground coffee powder 15 from the transit chamber 16 toward the outside. In these variants, the discharge member 18 can be for example a sideboard, a spatula, a blade, a bar or suchlike.

According to some embodiments described here, the air-powered powder removal member 20 can be used for example after a large part or most of the ground coffee powder 15 has already been discharged by the discharge member 18, for example due to gravity and exploiting the centrifugal force imparted by the grinding member 14. This is to remove possible residual ground coffee powder 15 that can still be present in the transit chamber 16 and possibly in the discharge member 18 and that has not been carefully discharged, for example because it has remained adhering to the surfaces. This removal action allows to eliminate from the transit chamber 16 and possibly from the discharge member 18 essentially all the ground coffee powder 15 produced in one grinding operation, so that, after a new grinding operation, the transit chamber 16 will contain only the new ground coffee powder 15. This solution allows to prevent cross contamination of the various mixtures of ground coffee powder 15 that are prepared in succession, guaranteeing that every individual mixture of coffee powder is characterized by its own organoleptic properties and not influenced by the organoleptic properties of other different mixtures prepared before it. Therefore, there is no carry-over of different mixtures of coffee powder prepared in series. In this way, each mixture of coffee powder preserves its own unique characteristics defined during a careful selection of types and doses of quantities of coffee beans.

For example, after it has been discharged from the transit chamber 16, the ground coffee powder 15 prepared according to the present description can be received outside the device 10 in a filter associated with a filter-carrier, subsequently compressed in a press, obtaining a compact panel of ground coffee which is then subjected to extraction to prepare the espresso coffee drink. Each portion of ground coffee powder 15 prepared according to the present description is therefore received in the filter, pressed and subjected to extraction, allowing to prepare an espresso coffee drink that corresponds to the recipe initially selected by the user or operator, without contamination with other mixtures.

In any case, in other example applications, after it has been discharged and removed from the transit chamber 16, there is nothing to prevent the ground coffee powder 15 prepared according to the present description from being received and collected in a package or container, which is then closed or sealed to be used at a later time.

In possible implementations, the device 10 can include a single air-powered powder removal member 20, but variant embodiments are possible which include several air-powered powder removal members 20, for example two, three or more than three. If there is a plurality of air-powered powder removal members 20, they can be positioned with a geometry correlated to the removal effect of the ground coffee powder 15 that is to be obtained, or alternatively, or in combination, they can be configured to generate air-powered removal phenomena characterized by different fluidic parameters, such as pressure or depression of the stream of air, speed of the stream of air, duration, type of stream (continuous or pulsed), sequence of the intervention.

According to possible embodiments described using FIG. 2, the air-powered powder removal member 20 can include a compressed air pneumatic member 22, in particular a compressed air blowing member, such as for example provided with a nozzle, pipette or similar delivery element, connected to a compressed air source. For example, according to other possible embodiments described using FIG. 2, the device 10 can include a pressurized container 28 containing compressed air that functions as a source of compressed air and that can be rechargeable or replaceable. In other variants, the device 10 can be connected to a pneumatic line supplying compressed air.

For example, the pneumatic member 22 can be disposed so as to generate the stream of air that passes through the grinding member 14 and hits the inside of the transit chamber 16 with a stream of compressed air which is able to remove the residual ground coffee powder 15 present, and directs it toward the discharge member 18, from which it is transferred toward the outside of the device 10, where for example it is received by the filter as described above, or introduced into a package or container for subsequent use. In possible implementations, the pneumatic member 22 can be configured to supply a continuous stream of compressed air, or a pulsed stream of compressed air, or a combination of the two. For example, a continuous stream of compressed air can have a duration comprised between 2 and 15 seconds, in particular between 4 and 12 seconds, more particularly between 6 and 10 seconds, or combinations of such intervals.

According to other possible embodiments described using FIG. 3, the air-powered powder removal member 20 can include an air suction member 24, that is, a member that generates a depression that sucks up the air and hence the possible residual ground coffee powder 15. The embodiments where the air-powered powder removal member 20 includes an air suction member 24 can be alternative to the embodiments where the air-powered powder removal member 20 includes a pneumatic member 22.

The air suction member 24 can be connected to a suction source 29, which generates a depression or vacuum condition. In this way, the air suction member 24 can generate a stream of aspirated air inside the transit chamber 16, sucking up and removing the residual ground coffee powder 15 present therein and possibly present in the discharge member 18, and can generate the stream of air that passes through the grinding member 14.

In possible implementations, the ground coffee powder 15 sucked up can be directly recovered and sent to the discharge member 18.

In other possible implementations, according to other possible embodiments described using FIG. 3, the device 10 can include a residual powder accumulation tank 30. In this way, the ground coffee powder 15 sucked in by the air suction member 24 can be received in the residual powder accumulation tank 30, which can be emptied as required. The residual powder accumulation tank 30 can be disposed between the air suction member 24 and the suction source 29. It can be provided that the ground coffee powder 15 sucked into the residual powder accumulation tank 30 is disposable, and therefore eliminated. Alternatively, it can be provided that the ground coffee powder 15 that is sucked into the residual powder accumulation tank 30 is recovered and sent to the discharge member 18, advantageously with every grinding of a specific dose, so as to prevent cross contamination and carry-over in the residual powder accumulation tank 30.

In possible embodiments, combinable with all the embodiments described here, the device 10 can comprise or be associated with a system controller or control board 100.

In particular, the system controller 100 can be configured to manage, command and control the functioning of the device 10 and the execution for example of the necessary cleaning cycles of the ground coffee powder, as described above, and also the execution of grinding cycles and the adjustment of the degree of grinding, as explained in more detail hereafter.

In particular, in possible example implementations, the system controller 100 can be configured to communicate with the outside, for example by association or integration with a suitable communication module, chosen according to the communication type and protocol used. For example, communication may be obtained by a cabled data connection, for example an Ethernet connection, for example LAN (Local Area Network), or a serial connection, such as RS232, or a USB connection or other. Otherwise, the communication can be obtained by a wireless data connection, for example radio, Wi-Fi protocol, or Bluetooth®, ZigBee, NFC (Near Field Communication), or infrared (Infrared Data Association, IrDA).

In some embodiments, the system controller 100 can include a microcontroller, or a microchip, or a central processing unit or CPU, associated with an electronic memory, possibly an electronic database and auxiliary circuits (or I/O).

For example, the CPU can be any form of computer processor used in the IT field for controlling apparatuses and devices in the field in question. The memory can be connected to the CPU and can be one of those commercially available, such as a random access memory (RAM), a read-only memory (ROM), floppy disk, hard disk, mass memory or any other form of digital archive, local or remote. The software instructions and data can be for example encoded and memorized in the memory to command the CPU. The auxiliary circuits can also be connected to the CPU to assist the processor in a conventional manner. The auxiliary circuits can include for example at least one of: cache circuits, feed circuits, clock circuits, input/output circuits, subsystems and suchlike. A program (or computer instructions) can determine which tasks can be done in accordance with the method according to the present description.

Figure 4:
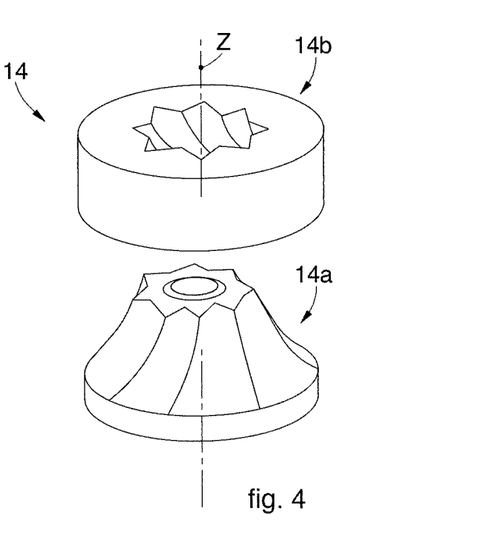
FIG. 4 is a schematic representation of a part of a device for grinding coffee beans according to embodiments described here.

In possible embodiments described using FIG. 4 and combinable with all the embodiments described here, the grinding member 14 can include a pair of grinders 14a, 14b, operatively associated with each other and one mobile with respect to the other to grind the coffee beans. For example, the grinders 14a, 14b are coaxial to a common central axis Z. The grinders 14a, 14b are typically provided with grinding teeth provided on respective grinding surfaces.

Moreover, the grinders 14a, 14b are able to move with a relative motion with respect to each other, at least to perform the grinding operation. In particular, one grinder 14a or rotor can be provided that is mobile during grinding, and one fixed grinder 14b or stator that is stationary during grinding. The terms "mobile/rotor" and "fixed/stator" refer to the respective condition of the grinders 14a, 14b during the grinding operation.

The reciprocal movement of the grinders 14a, 14b for the purposes of grinding can be determined by an actuation element 31.

According to some embodiments, the actuation element 31 can be commanded and controlled by said system controller 100.

Usually, an actuation element 31 as used in association with embodiments described here can be an actuator with an intrinsically rotary movement or be configured to convert a linear movement into a circular movement. The conversion can be commonly done by means of types of mechanism selected from a group consisting of: screw actuators, such as a jack screw, ball screw actuators and roll screw actuators, or wheel and axle, for example drum, gears, pulley or shaft actuators, such as a lifting cable, a winch, a rack and a pinion group, a chain transmission, a belt transmission, actuators with a rigid chain and a rigid belt. According to some embodiments, the actuation element 31 can include a drive member 32, provided with a drive shaft 34 and configured to determine the desired reciprocal movement of the grinders 14a, 14b. The drive member 32 is made to function by a source of energy, for example electric current, a hydraulic pressure fluid or a pneumatic pressure. The drive shaft 34 can be coupled with a respective bearing 34a. A base body 45 can be provided, which supports the actuation element 31, in particular the drive member 32. A drive member 32 as used in association with the embodiments described here can be a drive member chosen from a group comprising: an electric motor, a step electric motor, open squirrel cage or open coil electric motor, closed squirrel cage or closed coil electric motor, a magnetic motor, a linear axle with a motor, a linear motor, such as a mechanical linear motor, a piezo-electric linear motor, an electromagnetic linear motor, an electromechanical motor, an electromagnet, a gear motor, in particular a direct current gear motor.

In some embodiments, the grinders 14a, 14b are configured mobile in reciprocal rotation, around a common central axis Z (see FIG. 5 for example). In particular, the grinder 14a can be made to rotate around the central axis Z while the fixed grinder 14b remains stationary. To this purpose, the grinder 14a can be connected to the drive shaft 34, driven by the drive member 32 (see FIG. 5 for example).

In possible implementations, the grinders 14a, 14b are configured male/female. The grinders 14a, 14b, mating in shape, are thus inserted one into the other. The grinders 14a, 14b are for example essentially truncated cone shaped, mating with each other. In this configuration, the truncated cone grinders have grinding surfaces inclined by a determinate angle of inclination. For example the angle of inclination can be between 12° and 22°, in particular between 15° and 20°, more particularly between 16° and 18°.

In implementations where the grinders 14a, 14b are one inside the other, coaxial, and reciprocally mobile in rotation around the central axis Z for the purposes of grinding, it can be provided that the grinder 14a is internal, that is, it is disposed inside the grinder 14b, which therefore completely surrounds it on the outside.

The grinding operation actuated by the grinding member 14 can typically be influenced by different constructional and operating parameters. The constructional parameters are generally fixed and decided by the manufacturer of the grinders, such as geometry of the body and the grinding teeth, friction and surface hardness of the grinders, connected to the materials and workings used. The operating parameters can be variable, depending on the ingredients used, the atmospheric conditions and the desired result in the cup, such as for example the distance between the grinders 14a, 14b and/or the speed of rotation of the grinders 14a, 14b.

In possible embodiments, the relative distance between the grinders 14a, 14b can be adjustable, in order to vary the grain size of the ground coffee powder 15. Advantageously, the range of size in the adjustment of the distance is in micrometers. The distance can be adjusted manually, or automatically or semi-automatically. Consequently, the grinders 14a, 14b are able to move with a relative motion toward/away from each other along the central axis Z, also in order to adjust the reciprocal distance.

For example, to adjust the distance, grinder 14a can be made to move axially away from/toward the grinder 14b. The possibility that grinder 14b is mobile with respect to grinder 14a for the purpose of adjusting the reciprocal distance must not be understood here as in contrast with the fact that grinder 14*b* remains stationary and grinder 14*a* is made to move during the grinding operation. Furthermore, the operation to adjust the distance between the grinders 14*a*, 14*b* is carried out before the grinding operation and during this operation, once it has been preliminarily set, the distance is not varied.

In particular, the adjustment can be made by making grinder 14*b* rotate around the central axis Z, while grinder 14*a* is kept stationary.

In possible implementations, with every complete turn, grinder 14*b* descends by a determinate descent length and therefore is distanced from grinder 14*a* by a length correlated to the trigonometric function of the sine of the angle of inclination and the descent length. With every degree of rotation, grinder 14*b* moves nearer/away, depending on the direction of rotation, to/from grinder 14*a* by a distance in the order of some micrometers, in particular between 0.5 micron and 2 micron, more particularly between 0.75 micron and 1.5 micron, for example 1 micron. It is possible to control the movement of grinder 14*a* and 14*b* toward/away from each other by a micrometric control system. Therefore, grinder 14*a* and grinder 14*b* can be disposed at a variable distance from each other to selectively define a grinding space or gap correlated to a desired grain size of the ground coffee powder 15 to be obtained.

FIG. 5 is used to describe embodiments, combinable with all the embodiments described here, in which an automatic adjustment unit 35 is provided, configured to adjust the reciprocal distance between the grinders 14*a*, 14*b*. For example, the embodiments described using FIG. 5 can be combined both with the embodiments described in general using FIG. 1, and also with the specific embodiments described using FIG. 2, that is, in the case of the stream of compressed air, and also with the specific embodiments described using FIG. 3, that is, in the case of a stream of sucked in air.

In some embodiments, the automatic adjustment unit 35 can be commanded and controlled by, or by means of, the system controller 100. In other embodiments, the automatic adjustment unit 35 can be commanded and controlled directly from outside, and not by or by means of the system controller 100.

In some embodiments, the automatic adjustment unit 35 can be associated with the grinding chamber 19.

In some embodiments, combinable with all the embodiments described here, the automatic adjustment unit 35 can include an adjustment body 36, associated for example connected to the grinder 14*b*.

The adjustment body 36 is configured mobile, so as to allow to position grinder 14*b* with respect to grinder 14*a* for the purposes of the adjustment. The adjustment body 36 can be hollow, defining said entrance aperture 21. The air-powered powder removal member 20 can be completely or partly inserted into the adjustment body 36 and perform its removal function on the grinding member 14 and what is downstream of the latter, that is, possibly, the powder expulsion channel 13, the transit chamber 16, and possibly the discharge member 18. The adjustment body 36 can have a tubular shape, like a sleeve, a cup, a cylinder or suchlike.

In some embodiments, combinable with all the embodiments described here, the adjustment body 36 is axially associated along the central axis Z with a support body 38 by means of a threaded coupling 40. The threaded coupling 40 is defined by a threaded external surface of the adjustment body 36 and a mating threaded internal surface of the support body 38 (threaded system screw/lead screw). For example, the support body 38 can internally delimit the grinding chamber 19.

For example, the adjustment body 36 can be inserted, in particular, inside the support body 38, more particularly the adjustment body 36 can be inserted into the grinding chamber 19. Since it can be screwed to the support body 38, the adjustment body 36 is mobile with respect to the support body 38, in rotation around the central axis Z and axially along the same axis Z. Furthermore, the adjustment body 36 is solidly connected to grinder 14*b*, for example by one or more screws 37. In this way, the adjustment body 36 draws grinder 14*b* in movement with it, causing it to advance/retreat along the central axis Z. Thanks to the threaded coupling 40, by rotating the adjustment body 36 an axial displacement is also determined, advancing or retreating depending on the direction of rotation, of the adjustment body 36 and hence of grinder 14*b*. This displacement along the central axis Z therefore allows to modify the amplitude of the gap between the grinders 14*a*, 14*b*.

In some embodiments, combinable with all the embodiments described here, the automatic adjustment unit 35 can also include an actuation element 48, configured to supply movement for the reciprocal positioning of the grinders 14*a*, 14*b*. The automatic adjustment unit 35 can also include a system 41 to transmit motion from the actuation element 48 to the adjustment body 36, so as to transmit the necessary movement to drive the adjustment body 36 and selectively define the reciprocal position of the grinders 14*a*, 14*b*.

In possible example implementations, the motion transmission system 41 can include a drive transmission part 46, associated, for example connected, with the actuation element 48, and a driven transmission part 42 associated, for example connected, with the adjustment body 36. Furthermore, a motion transmission member 44 can be provided, associated, for example connected, with the drive transmission part 46 and the driven transmission part 42.

In possible example implementations, the motion transmission system 41 can be the type with belt and pulley, chain, chain and gears, gears, worm screw and pinion, epicycloid members or other motion transmission systems.

For example, the motion transmission member 44 can be chosen from either a belt, a flat belt, a trapezoid belt, a toothed belt, a rigid belt, a chain, a toothed chain, a chain with gears, a rigid chain, a series of gears, a rack or suchlike, or combination thereof.

For example, the drive transmission part 46 and the driven transmission part 42 can be chosen, in coordination and homogeneously with respect to each other, from pulleys, toothed wheels, gear wheels, gears, worm screws, pinion or suchlike, or a combination thereof. The choice of the drive transmission part 46 and the driven transmission part 42 is made in coordination with the type of motion transmission member 44 used.

In some embodiments, the actuation element 48 is configured to actuate the rotation movement of the drive transmission part 46. Advantageously, the actuation element 48 can be configured to supply a rotation motion both clockwise and anti/clockwise, according to needs. The motion of the drive transmission part 46 is transmitted, by means of the motion transmission member 44, to the driven transmission part 42 which therefore makes the adjustment body 36 rotate, in one direction of rotation or the other, thus allowing, as described above, to adjust the distance between the grinders 14*a*, 14*b*, that is, their reciprocal movement toward/away from each other. Furthermore, as described above, the actuation element 48 can include a drive member 47, also called positioning drive member because it is involved in the movement to adjust the reciprocal positioning of the grinders 14a, 14b, and a drive shaft 49. With regard to the possible implementations of actuation element 48 and drive member 47 usable in combination with the embodiments described here, the description regarding the actuation element 31 and the drive member 32 can apply.

Advantageously, the automatic adjustment unit 35 is configured so that, with every degree of rotation of the driven transmission part 42, and hence the adjustment body 36, there is a corresponding micrometric movement of adjustment, in particular between 0.5 micron and 2 micron, more particularly between 0.75 micron and 1.5 micron, for example about 1 micron, of grinder 14b with respect to grinder 14a. Advantageously, an angular position transducer or encoder 43 can be provided, associated with the drive member 47, in particular with the respective drive shaft 49, by means of which to precisely command and control the angular rotation supplied by the drive member 47 to the drive transmission part 46 and hence to reliably and precisely control the adjustment of the grain size. In particular, thanks to the angular position transducer or encoder 43, it is possible to precisely control the degrees of rotation of grinder 14b and hence its movement away from/toward the grinder 14a as described above.

In possible embodiments, the automatic adjustment unit 35 can be configured to move the grinders 14a, 14b reciprocally, for example advantageously at every start-of-grinding-cycle, in order to restore a desired initial reference position, or zero position, that is, to open the grinders 14a, 14b again with respect to the position assumed during the previous grinding cycle, so that the interspace or distance between them is a predetermined distance and known by the adjustment system, to be used as a reference.

In said zero position, therefore, the grinders 14a, 14b are at a known reciprocal distance and, starting from this position, a new adjustment can be made of the reciprocal position of the grinders 14a, 14b, as required by the subsequent grinding cycle, which adjustment can be different depending on the degree of grinding required by the specific selected mixture of coffee beans to be ground.

This solution allows to deal with possible shifts in the reciprocal position of the grinders 14a, 14b, that is, unwanted movements of the grinders 14a, 14b with respect to the position adjusted on each occasion, which can occur during grinding. Such shifts, if not taken into consideration, could lead to the adjustment being made with respect to a reference that is not homogeneous and consistent over time, and hence, in practice, make the adjustment imprecise. On the contrary, by returning the grinders 14a, 14b every time, with every new start-of-grinding cycle, to the zero position, in particular by moving or opening grinder 14a with respect to grinder 14b, the adjustment can be carried out each time with respect to the same zero position, and therefore with an increased precision of said adjustment.

In advantageous embodiments, the automatic adjustment unit 35 can be commanded and controlled remotely, for example by the system controller 100 or from the outside, for the purposes of the various adjustment operations described here. To this purpose, the automatic adjustment unit 35 can be associated with a communication module. The communication module can be for example the same as, or be configured like, the communication module associated with the system controller 100.

For example, the automatic adjustment unit 35 can be commanded remotely, directly or by the system controller 100, a mobile communication device, such as for example a smartphone, a palmtop, a tablet, a portable computer, a fixed computer or other, advantageously by a software application associated with the mobile communication device, for example executed thereon or executed remotely.

In embodiments described using FIG. 5, combinable with all the embodiments described here, a rotary element 39 can be provided, associated with the grinding member 14, able to facilitate the expulsion of the ground coffee powder 15 toward the transit chamber 16. In implementations described here, the rotary element 39 can be connected to grinder 14a and can rotate solidly therewith during grinding. The rotary element 39 can be disposed under grinder 14a and grinder 14b can be disposed at a distance from the rotary element 39 such as to define the powder expulsion channel 13. For example, the rotary element 39 can be a plate or disc, possible shaped.

In possible embodiments, combinable with all the embodiments described here, the device 10 can include an external body 11, or chassis or base or support frame, which encloses the internal components, in particular the grinding member 14, the transit chamber 16 and the necessary components and actuation, feed and control members.

Furthermore, in possible implementations, the device 10 can include a feed member 26 configured to receive the coffee beans and to feed them to the grinding member 14. The feed member 26 can be for example a loading hopper, a slide, a shaped collector, a funnel or other equivalent member.

In possible embodiments, combinable with all the embodiments described here, the device 10 can include a delivery mouth 27, which is disposed on the external body 11 of the device 10 and is in communication with the discharge member 18 from which it receives the ground coffee powder 15 to direct it, for example, to a filter, or to a package or container.

In possible embodiments, combinable with all the embodiments described here, the device 10 can include an upper covering element 50, provided to cover and protect the entrance aperture 21 for the coffee beans 12 to the grinding member 14. The covering element 50 can be provided with an aperture 50a through which the feed member 26 is inserted, to pour the coffee beans 12 toward the grinding member 14. The covering element 50 can be provided with one or more apertures 50b for the passage of the motion transmission member 44. One example of an upper covering element 50 can be a plate, a panel, a cap or suchlike.

Figure 6:
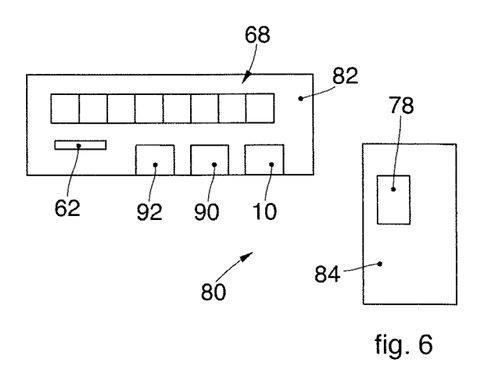
FIGS. 6, 7 and 8 are schematic representations of possible embodiments of a station for preparing coffee in which a device for grinding coffee beans according to other embodiments described here can be used.
Figure 7:
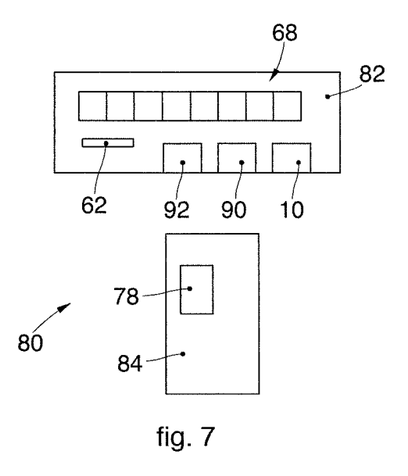
Figure 8:
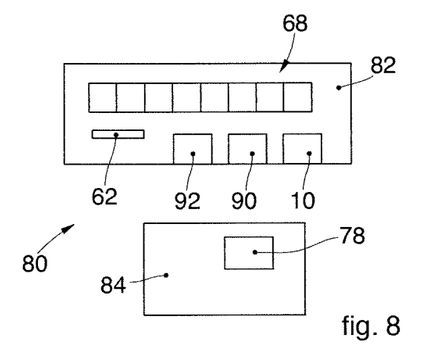

FIGS. 6, 7 and 8 are used to describe embodiments, combinable with all the embodiments described here, of a station 80 for preparing coffee, which includes an apparatus 68 to feed metered quantities of coffee beans to supply a mixture of coffee beans 12 with a desired composition, a device 10 according to the present description, and a coffee machine 78, able to produce the coffee drink, in particular espresso coffee, from the mixture of coffee powder obtained by grinding coffee beans 12.

In possible implementations, the station 80 for preparing coffee includes a section 82 to prepare the coffee powder mixture, which includes the device 10 and the apparatus 68 to feed metered quantities of coffee beans, and a section 84 to prepare the coffee drink which includes the coffee machine 78. FIGS. 6, 7 and 8 are used to describe various possible layouts of the station 80 for preparing coffee with a different reciprocal disposition of the section 82 to prepare the coffee powder mixture and the section 84 to prepare the coffee drink. According to some embodiments, described using FIGS. 6 and 7, the section 82 to prepare the coffee powder mixture can be disposed transverse, for example orthogonal, to the section 84 to prepare the coffee drink. The disposition of the section 82 to prepare the coffee powder mixture can be at the side of the section 84 to prepare the coffee drink (see FIG. 6) or in an intermediate position (see FIG. 7).

Figure 9:
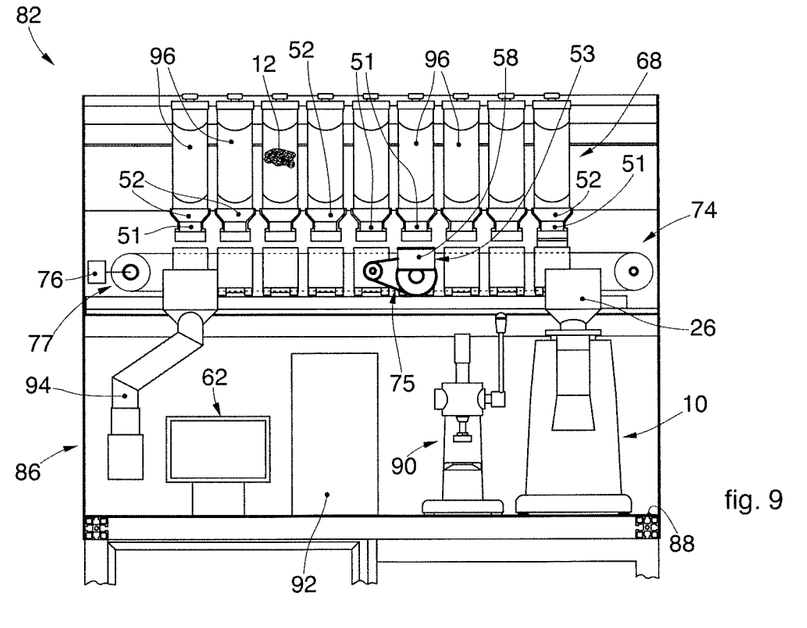
FIG. 9 is a front view of part of a station for preparing coffee in which a device for grinding coffee beans according to other embodiments described here can be used.

According to other embodiments, described using FIG. 9, the section 82 to prepare the coffee powder mixture can be disposed parallel, for example substantially in front in an opposite position, to the section 84 to prepare the coffee drink.

FIG. 9 is used for describing embodiments of a section 82 to prepare the coffee powder mixture which includes an apparatus 68 to feed metered quantities of coffee beans which provides a multiplicity or array of metering units 51 configured to measure out the coffee beans 12 in individual doses, and an incremental weighing unit 53 configured to weigh a quantity of coffee beans metered by the metering unit 51.

Each metering unit 51 can include a feed device 52 configured to feed the coffee beans in loose form. For example, each metering unit 51 can be associated with different types of coffee so that each feeds individual doses of coffee beans of different variety and type, so as to generate all in all a mixture of coffee beans 12 which will have the desired composition, that is, desired and specific quantities of coffee beans of different types, which can be chosen by the consumer or user according to his/her own personal taste.

Furthermore, the incremental weighing unit 53 can include a container 58 to receive the coffee beans transferred by each metering unit 51, and a sensor unit configured to detect the weight force acting on the container 58 defined on each occasion by the coffee beans which are successively introduced therein, so that, at the end of the various metering operations, there is a quantity of mixture of coffee beans 12 present in the container 58 that is the desired quantity and final composition, which will then be ground by the device 10.

The section 82 to prepare the coffee powder mixture includes a frame 86 which supports the apparatus 68 to feed metered quantities of coffee beans and possibly also the device 10. A plurality of transfer members 96 are provided, each coupled with a respective feed device 52 of a respective metering unit 51, which function as a system to feed the coffee beans. A movement device 74 is also provided, configured to move a container 58 associated with a sensor unit with respect to the feed devices 52.

In possible implementations, the device 10 according to the present description is put into cooperation with the array of metering units 51, and can receive the mixture of coffee beans ready from the container 58. To this purpose, an upending member 75 is provided on the movement device 74, and is configured to act on the container 58 when the latter is aligned with the device 10, in particular when for example it is associated with the feed member 26. The frame 86 comprises a support plane 88 which supports the device 10. A pressing device or tamper 90 can also be provided, to tamp the coffee powder, which can be disposed on the support plane 88, for example next to the device 10. A vacuum packaging device 92 can also be provided, to vacuum pack in a suitable package, container, bag or sachet the metered coffee beans or the coffee powder produced by the device 10, if they are not used immediately but supplied for subsequent use. The vacuum packaging device 92 can also be disposed on the support plane 88, for example next to the pressing device 90. A user/operator interface 62 can also be provided, for example a touchscreen, also on the support plane 88. Furthermore, if the weighed mixture of coffee beans is not introduced into the device 10 and ground, but supplied such as it is, then a discharge system 94 can be provided, which can receive the coffee beans from the container 58 and, for example, transfer them or pour them into a suitable package which then, for example, can be vacuum packed.

It is clear that modifications and/or additions of parts may be made to the device 10 and method for grinding coffee beans as described heretofore, without departing from the field and scope of the present invention.

For example, in possible embodiments, combinable with all the embodiments described here, a system of packings can be provided, at least in correspondence with the bearing 34*a* of the drive shaft 34 associated with the drive member 32 described for example using FIG. 5, to seal the upper grinding chamber 19 from the lower part of the device 10, that is, the lower chamber where the drive member 32 is housed, preventing the entrance and deposit of the ground coffee powder.

This solution can be advantageous to insulate the drive member 32 below, so as to prevent leakage of powders and the consequent risk of explosions which could be caused by the presence or accidental entrance, in the lower chamber where the drive member 32 is housed, of fine powder of ground coffee and sparks or potential explosions of other type.

To this purpose, moreover, it can be advantageous to use an electric drive member 32 of the closed squirrel cage type, to protect the drive member 32 and prevent the fine powder of ground coffee from entering into and depositing inside the drive member 32 itself.

It is also clear that, although the present invention has been described with reference to some specific examples, a person of skill in the art shall certainly be able to achieve many other equivalent forms of device and method for grinding coffee beans, having the characteristics as set forth in the claims and hence all coming within the field of protection defined thereby.

Although the above refers to embodiments of the invention, other embodiments can be provided without departing from the main field of protection, which is defined by the following claims.

In the following claims, the sole purpose of the references in brackets is to facilitate reading: they must not be considered as restrictive factors with regard to the field of protection claimed in the specific claims.

The invention claimed is:

1. A device for grinding coffee beans (12), wherein said device comprises:
   a grinding member (14) configured to grind coffee beans (12) and produce a ground coffee powder (15);
   a transit chamber (16) configured to receive the ground coffee powder (15);
   a discharge member (18) configured to discharge the ground coffee powder (15) arriving from the transit chamber (16) toward the outside of said device; and
   at least one air-powered powder removal member (20) configured to generate a stream of air through said grinding member (14), sufficient to remove essentially all of the ground coffee powder (15) from the grinding member (14) and from the transit chamber (16) preventing a second ground coffee powder (15) prepared in succession from being influenced by the organoleptic properties of the ground coffee powder (15),
wherein said device is provided with an entrance aperture (21) associated with the grinding member (14) through which to feed the coffee beans, and wherein the entrance aperture is associated with the at least one air-powered powder removal member (20) and with the grinding member (14), upstream of the grinding member (14).

2. Device as in claim 1, wherein said device an exit aperture (23) through which the ground coffee powder (15) is discharged to the outside, and the exit aperture (23) is associated with the discharge member (18), a working path developing between the entrance aperture (21) and the exit aperture (23), working coffee beans (12) to ground coffee powder (15).

3. Device as in claim 2, wherein the entrance aperture (21) is disposed in an upper part of the device, and the transit chamber (16) is disposed directly downstream of the grinding member (14) with respect to the working path of the coffee, to receive the ground coffee powder (15) from the grinding member (14), and the discharge member (18) is provided downstream of the transit chamber (16), along the working path of the coffee.

4. Device as in claim 1, wherein said device comprises a single air-powered powder removal member (20).

5. Device as in claim 1, wherein said device comprises several air-powered powder removal members (20).

6. Device as in claim 1, wherein said air-powered powder removal member (20) comprises a pneumatic member (22) for blowing in compressed air.

7. Device as in claim 1, wherein said air-powered powder removal member (20) comprises an air suction member (24).

8. Device as in claim 1, wherein said grinding member (14) comprises a pair of grinders (14a, 14b) coaxial with respect to a common central axis (Z).

9. Device as in claim 8, wherein said device comprises an automatic adjustment unit (35) configured to adjust a reciprocal distance between the grinders (14a, 14b) and which comprises an adjustment body (36) connected to grinder (14b) and mobile, so as to allow the positioning of grinder (14b) with respect to grinder (14a) for the adjustment, the adjustment body (36) being associated axially along the central axis (Z) to a support body (38) by means of a threaded coupling (40).

10. Device as in claim 9, wherein said automatic adjustment unit (35) comprises a drive transmission part (46), associated with an actuation element (48), a driven transmission part (42) associated with the adjustment body (36), a motion transmission member (44) associated with the driven transmission part (42) and the drive transmission part (46).

11. Device as in claim 10, wherein a micrometric adjustment movement of grinder (14b) with respect to grinder (14a) corresponds to every degree of rotation of the driven transmission part (42).

12. A station for preparing coffee, wherein said station comprises an apparatus (68) to feed metered quantities of coffee beans to supply a mixture of coffee beans (12) with a desired composition, a device (10) to grind coffee beans (12) according to claim 1, and a coffee machine (78), able to produce the coffee drink from the mixture of coffee powder obtained.

13. Station as in claim 12, wherein said apparatus (68) to feed metered quantities of coffee beans comprises:
an array of metering units (51) each configured to measure out the coffee beans (12) in individual doses and provided with a feed device (52) configured to feed coffee beans in loose form;
an incremental weighing unit (53) configured to weigh a quantity of coffee beans metered by the metering unit (51), and provided with a container (58) to receive the coffee beans transferred from each metering unit (51), and with a sensor unit configured to detect the weight force acting on the container (58).

14. Station as in claim 12, wherein said station comprises a section (82) to prepare the coffee powder mixture, which comprises said device (10) for grinding coffee beans (12) and said apparatus (68) to feed metered quantities of coffee beans, and a section (84) to prepare the coffee drink which comprises the coffee machine (78).

15. Station as in claim 14, wherein said section (82) to prepare the coffee powder mixture comprises a frame (86) that supports the apparatus (68) to feed metered quantities of coffee beans.

16. Station as in claim 14, wherein said section (82) to prepare the coffee powder mixture comprises:
a plurality of transfer members (96), each coupled to a respective feed device (52) of a respective metering unit (51), to transfer the coffee beans (12); and
a movement device (74) configured to move, with respect to the feed devices (52), a container (58) to receive the coffee beans and associated with a sensor unit configured to detect the weight force acting on the container (58).

17. Station as in claim 16, wherein the movement device (74) comprises an upending member (75) to upend the container (58), wherein said device (10) is located in cooperation with the array of metering units (51), receiving the coffee beans from the container (58) upended by the upending member (75).

18. Station as in claim 14, wherein said section (82) to prepare the coffee powder mixture also comprises a pressing device (90) to press the coffee powder.

19. A method for grinding coffee beans (12), comprising:
grinding coffee beans (12) by means of a grinding member (14) to produce a ground coffee powder (15) that is made to transit through a transit chamber (16) and, by means of a discharge member (18), is then discharged toward a receiving container, wherein an entrance aperture (21) is associated with the grinding member (14) through which to feed the coffee beans, and at least one air-powered powder removal member (20) is disposed near the entrance aperture (21), upstream of the grinding member (14); and
removing essentially all of the ground coffee powder (15) from the grinding member (14) and from the transit chamber (16) by means of a stream of air generated through said grinding member (14) by the at least one air-powered removal member (20), preventing a second ground coffee powder (15) prepared in succession from being influenced by the organoleptic properties of the ground coffee powder (15).

20. Method as in claim 19, wherein the stream of air is obtained by blowing in compressed air.

21. Method as in claim 19, wherein the stream of air is obtained by means of air suction.

22. A method for preparing coffee, comprising:
feeding metered quantities of coffee beans (12) to supply a mixture of coffee beans (12) with a desired composition;
grinding the coffee beans (12) into the desired composition in accordance with claim 19; and
producing the coffee drink from a mixture of ground coffee powder (15) obtained from grinding.

* * * * *